(12) United States Patent
Newton et al.

(10) Patent No.: US 10,850,615 B2
(45) Date of Patent: Dec. 1, 2020

(54) VEHICLE DISPLAY INCLUDING A CAMERA

(71) Applicant: Aptiv Technologies Limited, St. Michael (BB)

(72) Inventors: John Newton, Auckland (NZ); J. Roger Davis, Russiaville, IN (US)

(73) Assignee: Aptiv Technologies Limited, St. Michael (BB)

( * ) Notice: Subject to any disclaimer, the term of this patent is extended or adjusted under 35 U.S.C. 154(b) by 0 days.

(21) Appl. No.: 16/424,887

(22) Filed: May 29, 2019

(65) Prior Publication Data

US 2020/0047616 A1 Feb. 13, 2020

Related U.S. Application Data

(60) Provisional application No. 62/715,400, filed on Aug. 7, 2018.

(51) Int. Cl.
*A61B 5/18* (2006.01)
*B60K 28/06* (2006.01)
(Continued)

(52) U.S. Cl.
CPC ............ *B60K 28/066* (2013.01); *G02B 27/01* (2013.01); *G06K 9/00362* (2013.01); *G08B 21/06* (2013.01); *G06T 2207/30201* (2013.01)

(58) Field of Classification Search
CPC ...... A63F 13/00; A63F 13/211; A63F 13/212; A63F 13/213; A63F 13/428; G02B 27/017; G02B 27/01; G06F 1/163; G06F 3/011; G06F 3/0338; G06F 3/0346; G06F 3/04842; G06K 9/00255; G06K 9/00288; G06K 9/00671; G06K 9/4628; G06K 9/6256; G06K 9/627; G06K 9/00362; G06N 3/006; G06N 3/04; G06N 3/0445; G06N 3/0454; G06N 3/08; G06N 5/003; G06N 7/005; B60K 2370/149; B60K 2370/1523; B60K 2370/21; B60K 2370/23; B60K 2370/25;
(Continued)

(56) References Cited

U.S. PATENT DOCUMENTS

| 8,992,050 B1 * | 3/2015 | Yuan | H04N 13/25 362/293 |
|---|---|---|---|
| 2008/0165267 A1 * | 7/2008 | Cok | H04N 7/144 348/333.01 |

(Continued)

OTHER PUBLICATIONS

European Search Report for Application No. EP19189771, European Patent Office, dated Nov. 27, 2019.

*Primary Examiner* — Daniel Previl
(74) *Attorney, Agent, or Firm* — Colby Nipper PLLC

(57) ABSTRACT

An illustrative example assembly includes a display having a first side for displaying at least one image and a second side facing opposite the first side. The display includes a first portion having a first plurality of layers between the first side and the second side. The display includes a second portion having a second plurality of layers between the first side and the second side. The second plurality of layers includes at least one additional layer more than the first plurality of layers. A camera is situated near the second side of the display with a field of view of the camera at least partially aligned with the first portion of the display.

20 Claims, 6 Drawing Sheets

(51) Int. Cl.
*G02B 27/01* (2006.01)
*G06K 9/00* (2006.01)
*G08B 21/06* (2006.01)

(58) Field of Classification Search
CPC .......... B60K 2370/682; B60K 2370/98; B60K 28/066; B60K 35/00; B60W 2540/22; G06T 2207/30201; G08B 21/06
USPC ....... 340/576, 583, 598, 612, 647, 675, 680, 340/691.6, 5.32, 7.55
See application file for complete search history.

(56) References Cited

U.S. PATENT DOCUMENTS

| | | | |
|---|---|---|---|
| 2012/0154591 A1* | 6/2012 | Baur | B60R 1/00 348/148 |
| 2016/0375833 A1* | 12/2016 | Larson | B60R 1/12 348/148 |
| 2018/0013944 A1 | 1/2018 | Evans et al. | |
| 2018/0079370 A1* | 3/2018 | Davis | B60R 11/04 |

* cited by examiner

VEHICLE DISPLAY INCLUDING A CAMERA

BACKGROUND

Modern automotive vehicles include a variety of features that enhance a driver's experience and safety. One such feature is a camera or sensor that monitors a driver's gaze or attention and provides an indication when the driver appears to be distracted or drowsy. An alert may be provided to the driver to assist the driver in maintaining appropriate focus on the road. One challenge associated with providing such a camera or sensor has been placing it within the vehicle in a position to capture images of the driver's eyes while not interfering with the aesthetics of the vehicle interior.

It has been proposed to incorporate such sensors or cameras into a visual display that is part of an instrument cluster. This approach may provide a useful camera location but previous proposals have not been able to avoid interrupting the appearance of the display and some leave the camera noticeably visible to the driver. Another shortcoming of previous proposals is that they tend to introduce complexity and additional expense to the manufacture of the display.

SUMMARY

An illustrative example assembly includes a display having a first side for displaying at least one image and a second side facing opposite the first side. The display includes a first portion having a first plurality of layers between the first side and the second side. The display includes a second portion having a second plurality of layers between the first side and the second side. The second plurality of layers includes at least one additional layer more than the first plurality of layers. A camera is situated near the second side of the display with a field of view of the camera at least partially aligned with the first portion of the display.

In an example embodiment having one or more features of the assembly of the previous paragraph, the at least one additional layer comprises an electrically conductive material. In an example embodiment having one or more features of the assembly of any of the previous paragraphs, the at least one additional layer comprises metal.

In an example embodiment having one or more features of the assembly of any of the previous paragraphs, the display comprises a liquid crystal display and the at least one additional layer comprises a gate line layer and a data line layer.

In an example embodiment having one or more features of the assembly of any of the previous paragraphs, the at least one additional layer comprises an insulator.

In an example embodiment having one or more features of the assembly of any of the previous paragraphs, one of the layers in the first portion comprises an epoxy that is transparent to infrared radiation, the one of the layers is aligned with a corresponding layer in the second portion, and the corresponding layer in the second portion comprises liquid crystal.

An example embodiment having one or more features of the assembly of any of the previous paragraphs includes a backlight module that includes reflecting nano-structures and wherein a portion of the backlight module is aligned with the field of view of the camera and the reflecting nano-structures in the portion have a dimension that is smaller than others of the reflecting nano-structures in another portion of the backlight module.

In an example embodiment having one or more features of the assembly of any of the previous paragraphs, one of the first plurality of layers near the first side comprises color filters and a corresponding one of the second plurality of layers near the first side comprises the color filters and at least one additional color filter.

In an example embodiment having one or more features of the assembly of any of the previous paragraphs, the first plurality of layers comprises at least one liquid crystal layer and a substrate layer on each of two opposite sides of the liquid crystal layer.

In an example embodiment having one or more features of the assembly of any of the previous paragraphs, the first plurality of layers has a first total thickness between the first side and the second side, the second plurality of layers has a second total thickness between the first side and the second side, and the first total thickness is equal to the second total thickness.

In an example embodiment having one or more features of the assembly of any of the previous paragraphs, the display is at least part of an instrument panel in a vehicle and the camera is situated to capture image information regarding at least one characteristic of a driver of the vehicle.

In an example embodiment having one or more features of the assembly of any of the previous paragraphs, the camera is an infrared camera, the first plurality of layers at least partially permit infrared radiation to pass through the first plurality of layers, and the at least one additional layer hinders infrared radiation from passing through the at least one additional layer.

Another illustrative example assembly includes display means for displaying at least one image on a first side of the display means, a second side of the display means facing opposite the first side. The display means includes a first portion having a first plurality of layers between the first side and the second side. The display means includes a second portion having a second plurality of layers between the first side and the second side. The second plurality of layers include at least one additional layer more than the first plurality of layers. Camera means capture image information. The camera means is situated near the second side of the display means. A field of view of the camera means is at least partially aligned with the first portion of the display means.

In an example embodiment having one or more features of the assembly of the previous paragraph, at least one of the second plurality of layers comprises liquid crystal and the at least one additional layer comprises an electrically conductive material establishing at least one of a gate line layer and a data line layer.

In an example embodiment having one or more features of the assembly of any of the previous paragraphs, one of the layers in the first portion comprises an epoxy that allows infrared radiation to at least partially pass through the epoxy, the one of the layers is aligned with a corresponding layer in the second portion, and the corresponding layer in the second portion comprises liquid crystal.

In an example embodiment having one or more features of the assembly of any of the previous paragraphs, one of the first plurality of layers near the first side comprises color filters and a corresponding one of the second plurality of layers near the first side comprises the color filters and at least one additional color filter.

In an example embodiment having one or more features of the assembly of any of the previous paragraphs, the display means is at least part of an instrument panel in a vehicle and the image information captured by the camera means corresponds to at least one characteristic of a driver of the vehicle.

In an example embodiment having one or more features of the assembly of any of the previous paragraphs, the camera means comprises an infrared camera, the first plurality of layers at least partially permit infrared radiation to pass through the first plurality of layers, and the at least one additional layer hinders infrared radiation from passing through the at least one additional layer.

An illustrative example method of making an assembly with a camera and a display includes: establishing a first plurality of layers in a first portion of the display, the first plurality of layers being between a first side of the display that is configured to display at least one image and a second, oppositely facing side of the display; establishing a second plurality of layers in a second portion of the display between the first side and the second side, the second plurality of layers including at least one additional layer more than the first plurality of layers; and situating the camera near the second side of the display with a field of view of the camera at least partially aligned with the first portion of the display.

In an example embodiment having one or more features of the method of the previous paragraph, at least one of the second plurality of layers comprises liquid crystal and the at least one additional layer comprises an electrically conductive material establishing at least one of a gate line layer and a data line layer.

Various features and advantages of at least one disclosed example embodiment will become apparent to those skilled in the art from the following detailed description. The drawings that accompany the detailed description can be briefly describe as follows.

DETAILED DESCRIPTION

Figure 1:
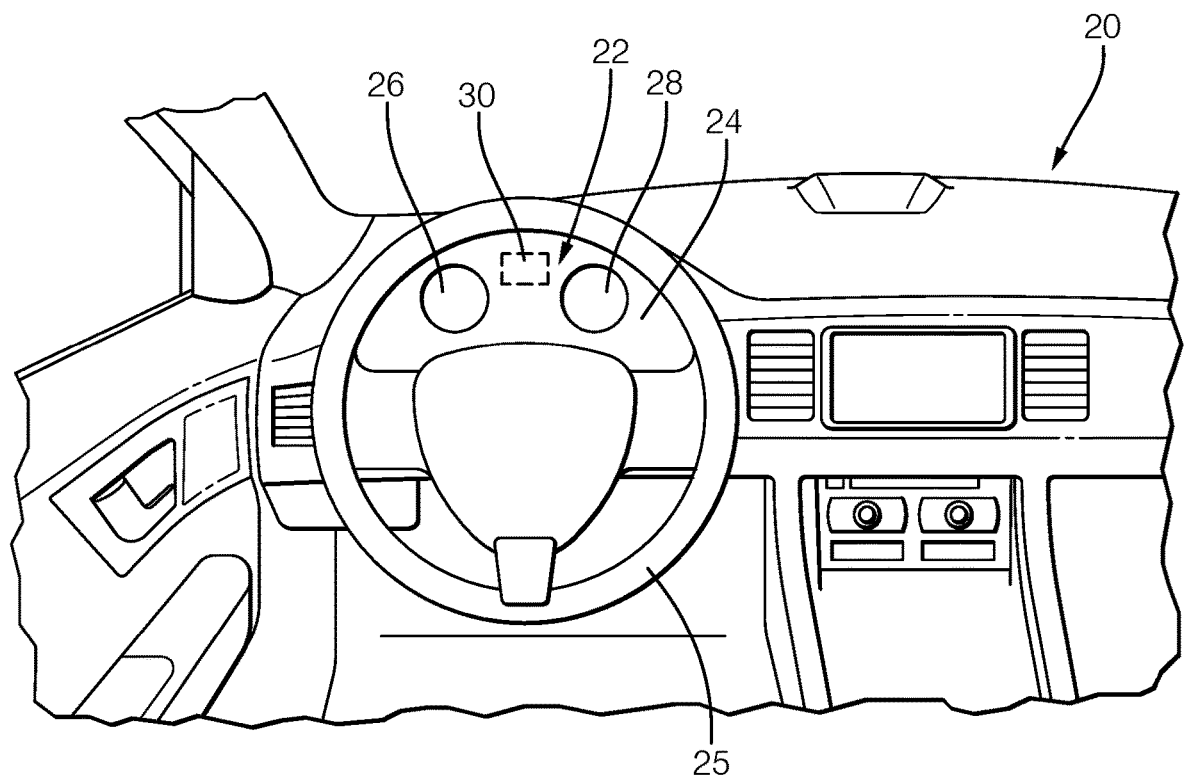
FIG. 1 illustrates selected portions of an example vehicle interior including a display with a camera designed according to an embodiment of this invention.

FIG. 1 schematically shows selected portions of an interior of a vehicle 20. A display 22 includes a first side 24 facing toward the vehicle interior for displaying at least one image. In the illustrated example, the display 22 is situated in front of a steering wheel 25 and serves as at least part of an instrument cluster including visual indications 26 and 28 regarding vehicle operation. For example, the indication 26 may correspond to a tachometer and the indication 28 may correspond to a speedometer.

Figure 2:
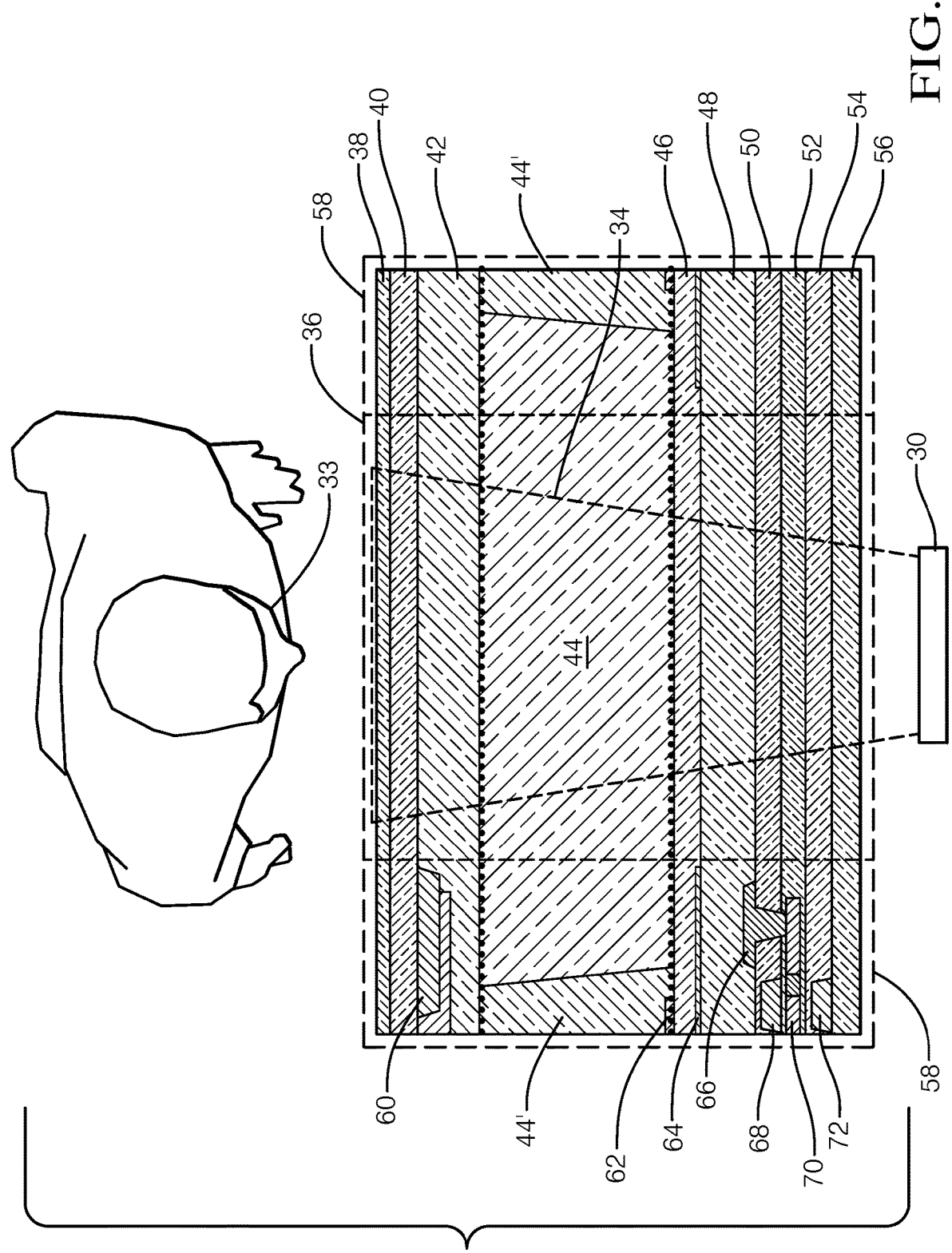
FIG. 2 is a partial cross-sectional illustration of an example display and camera configuration.

A camera 30 is situated behind at least a portion of the display 22. As shown in FIG. 2, the camera 30 is situated near a second side 32 of the display 22. The camera 30 is situated in a location of the display 22 where a driver 33 will be in a field of view 34 of the camera 30. The camera 30 is configured to capture images of the driver's face and eyes for monitoring the driver's gaze, for example. In some embodiments, the camera 30 is a near-infrared camera that uses known NIR techniques to provide information regarding the driver's eyes to a processor (not illustrated).

The display 22 includes features that allow for locating the camera 30 where there is a clear line of sight to the driver's eyes within the field of view 34 of the camera 30 while maintaining a desirable visual appearance of the display 22. As shown in FIG. 2, the display 22 has a first portion 36 that includes a first plurality of layers 38-56 between the first side 24 and the second side 32 of the display 22. The camera 30 is situated near the second side 32 where the field of view 34 is at least partially aligned with the first portion 36 of the display 22. In this example, a width of the first portion 36 is wide enough to accommodate an entire width of the illustrated portion of the field of view 34.

The first plurality of layers 38-56 respectively comprise materials that allow for sufficient transmission of the type of radiation or light that the camera 30 uses to generate image information. The layers 38-56 in the illustrated example are at least partially transparent to near-infrared radiation so that the camera 30 is able to capture images of the driver's eyes through those layers. There is no metallization in the first portion 36 to avoid moire and diffraction interference in an image captured by the camera 30.

The display 22 includes a second portion 58 surrounding the example first portion 36. The second portion 58 includes a second plurality of layers including at least one additional layer more than the first plurality of layers 38-56. In this example, the second plurality of layers includes the layers 38-42 and 46-56, a layer 44' aligned with the layer 44 of the first portion 36, and additional layers 60-72. At least one of the additional layers 60-72 at least partially hinders transmission of the radiation used by the camera 30 for generating image information. Such layers are useful or necessary for the display 22 to provide desired visual representations and are included in the second portion 58 but not the first portion 36 to allow the camera 30 to function as desired while strategically located to capture images of the driver's eyes.

In the illustrated example, the display 22 is a liquid crystal display (LCD) that includes a liquid crystal layer 44' in the second portion 58. The layer 44 of the first portion 36 includes an epoxy material that is transparent to the type of radiation used by the camera 30 (e.g., near-infrared). The epoxy material of the layer 44 ensures good resolution image information from the camera 30 is available for a desired purpose, such as monitoring the driver's gaze. In one example embodiment, the epoxy material is a photo-resist epoxy that is opaque to ultraviolet radiation but transparent to near-infrared. The epoxy may serve as a barrier to prevent the liquid crystal material from entering the area of the first portion 36 during manufacture of the display 22. The same epoxy material may be used to establish photo spacers between the layers 42 and 46 and in some embodiments the epoxy in the first portion 36 extends across a spacing that would otherwise exist between two such spacers.

The layers 44 and 44' may be considered corresponding layers or layers that are aligned and occupying essentially the same space or location between the first side 24 and the second side 32 of the display 22. As can be appreciated from FIG. 2, the layers 44 and 44' have a similar thickness (from top-to-bottom in the drawing) in this example.

The illustrated layers in FIG. 2 comprise known materials and serve known functions within a LCD display. In this example, a black mask layer 60 is present in the second portion 58 but not included in the first portion 36. The layers 62 and 64 include an electrically conductive material, such as indium tin oxide. The layers 66 and 68 are also metallic and electrically conductive and serve as a data line layer and a gate line layer, respectively. In this example, the at least one additional layer in the second plurality of layers includes a channel layer 70 and a shading layer 72.

The layers 38-56 that are present in the first portion 36 allow for desired camera performance while at least partially camouflaging the presence of the camera 30 near the second side 32. The illustrated embodiment provides a superior aesthetic for the display 22 compared to arrangements that include a hole in the display for receiving a camera because in the latter, the camera is readily visible or noticeable and is perceived as an interruption of the display. With the illustrated arrangement, however, the camera 30 is not easily noticeable even though the first portion 36 of the display 22 does not function to show any displayed images.

Figure 3:
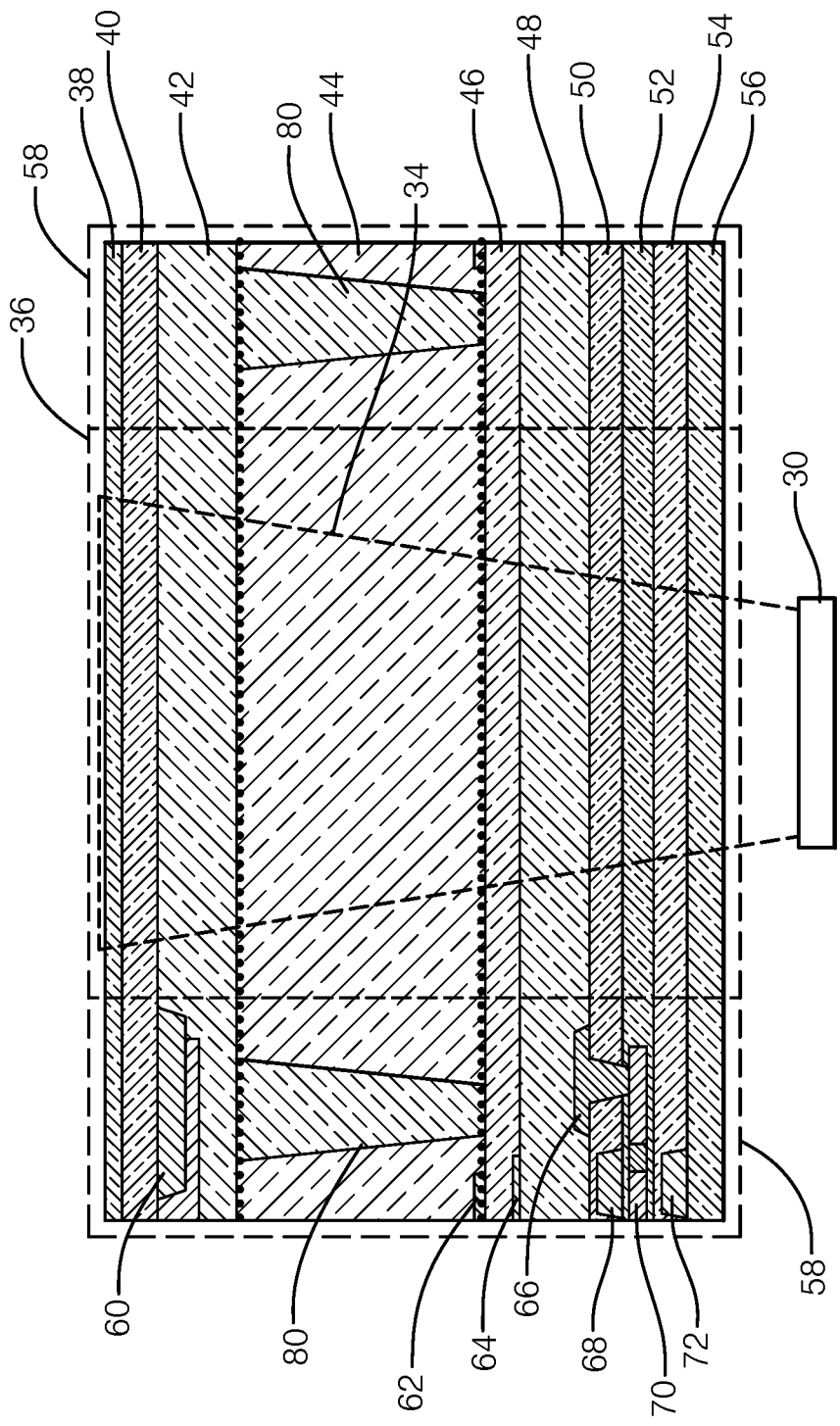
FIG. 3 is a partial cross-sectional illustration of another example display and camera configuration.

FIG. 3 shows another example embodiment. In this example, the layer 44 comprises liquid crystal in the first portion 36 and the second portion 58 rather than the epoxy material in the layer 44 like that included in the embodiment of FIG. 2. The space occupied by the first layer 44 also includes photo-spacer supports 80, which may be epoxy, that are distributed within the second portion 58 in a known manner to provide support within the layer 44.

Figure 4:
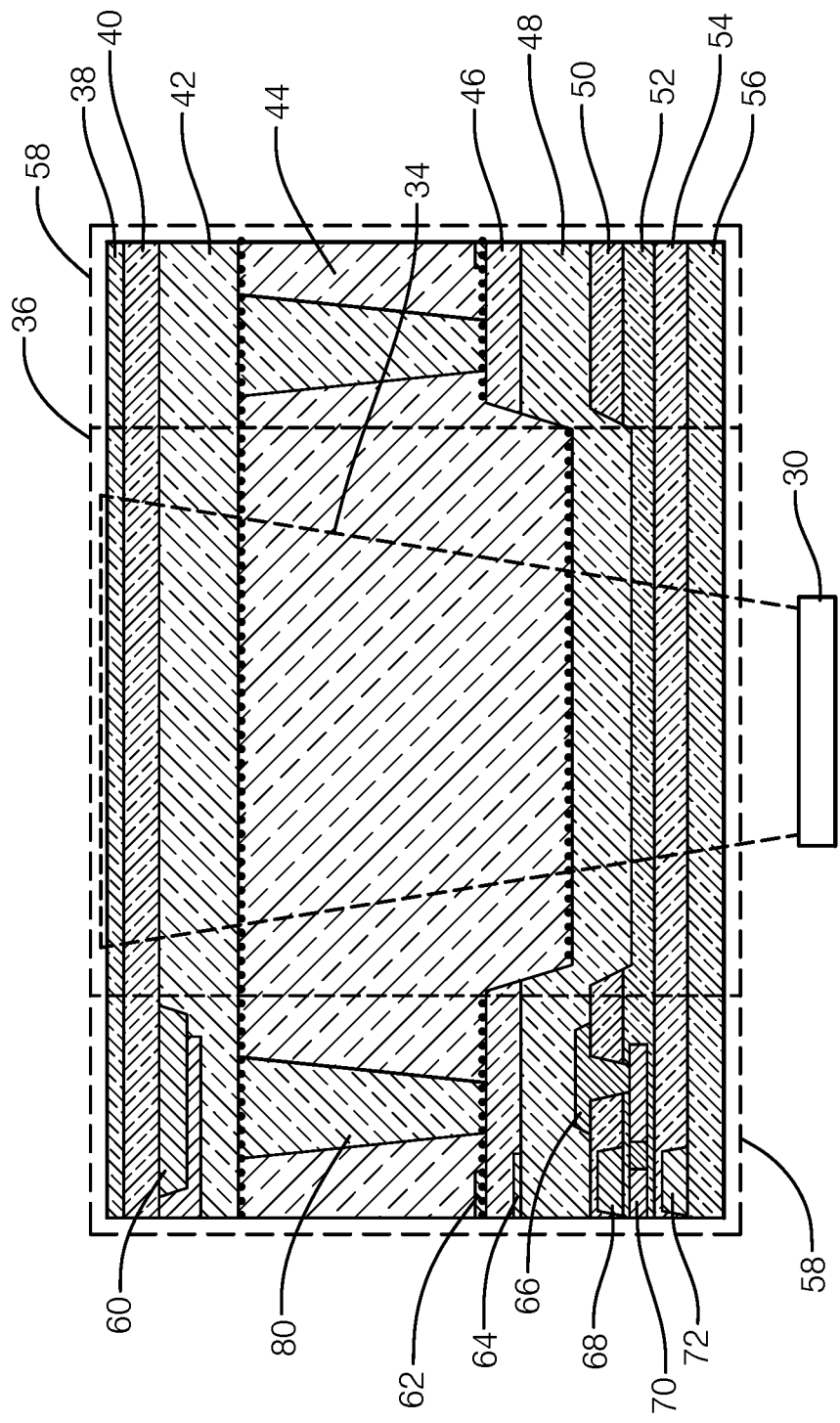
FIG. 4 is a partial cross-sectional illustration of another configuration of a display and a camera.

Another configuration is shown in FIG. 4. In this embodiment the layers 46 and 50, which are insulator layers, are not present in the first portion 36. The space that would have been occupied by those layers is occupied by some of the liquid crystal of the layer 44 and the organic material of the layer 48, respectively. Also, the layer 44 is thicker in the first portion 36 than in the second portion 58.

The embodiments shown in FIGS. 3 and 4 are useful for assemblies that include a camera that is sensitive to radiation that is able to pass through the liquid crystal material of the layer 44 sufficiently to provide adequate image resolution for the camera 30 to serve its intended purpose.

Figure 5:
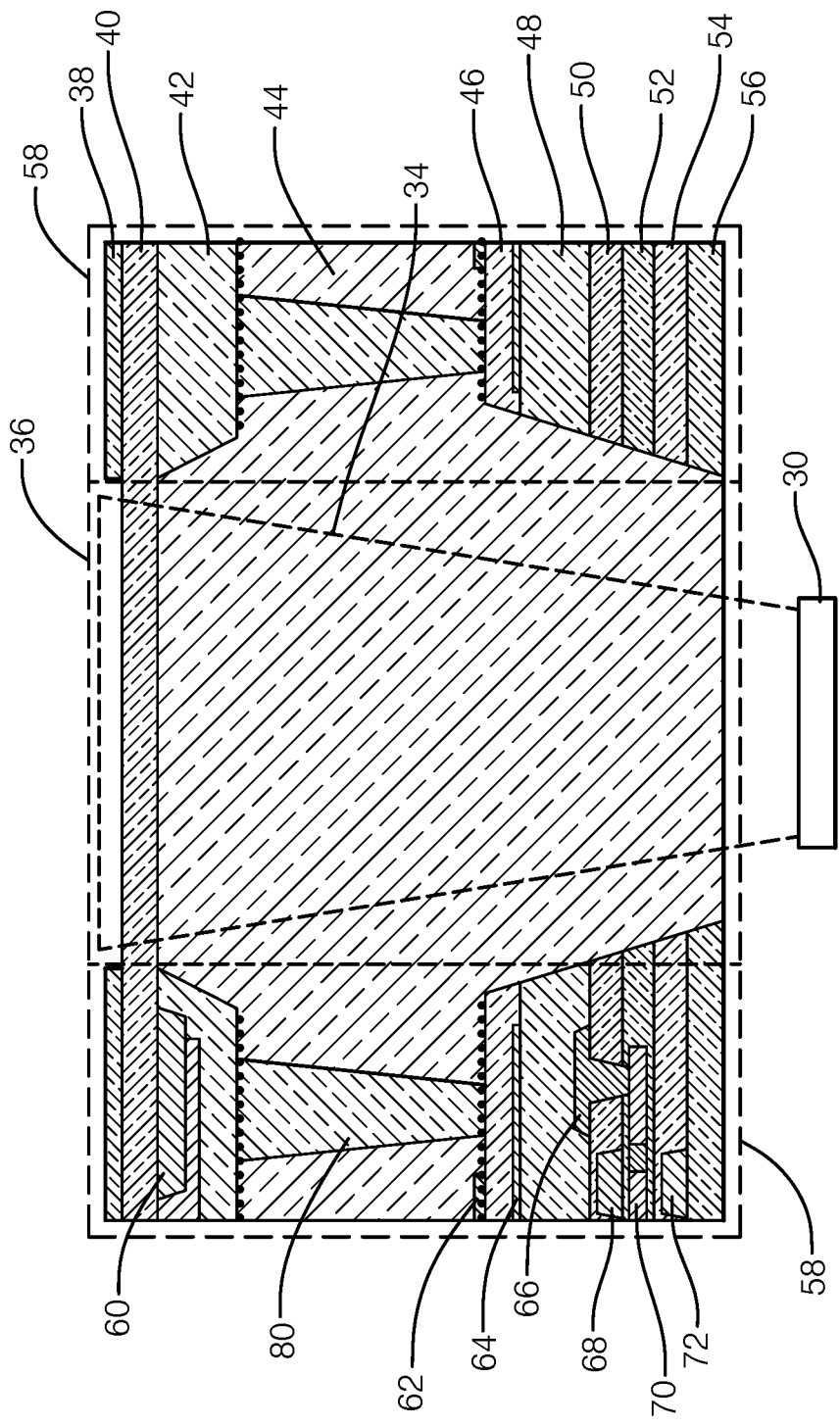
FIG. 5 shows another embodiment in a partial cross-sectional view.

Another example embodiment is shown in FIG. 5, which includes fewer layers in the first portion 36 compared to the other example embodiments. In this example, only the layers 40, 44 and 56 are established in the first portion 36. The layers 38 and 56 are substrate layers that maintain the liquid crystal of the layer 44 within the first portion 36. The layer 44 in the first portion 36 occupies as much space as several more layers in the second portion 58 in this example. Such an embodiment provides a larger amount of transparency to or transmission of radiation used by the camera 30 for generating images of the driver's eyes.

Figure 6:
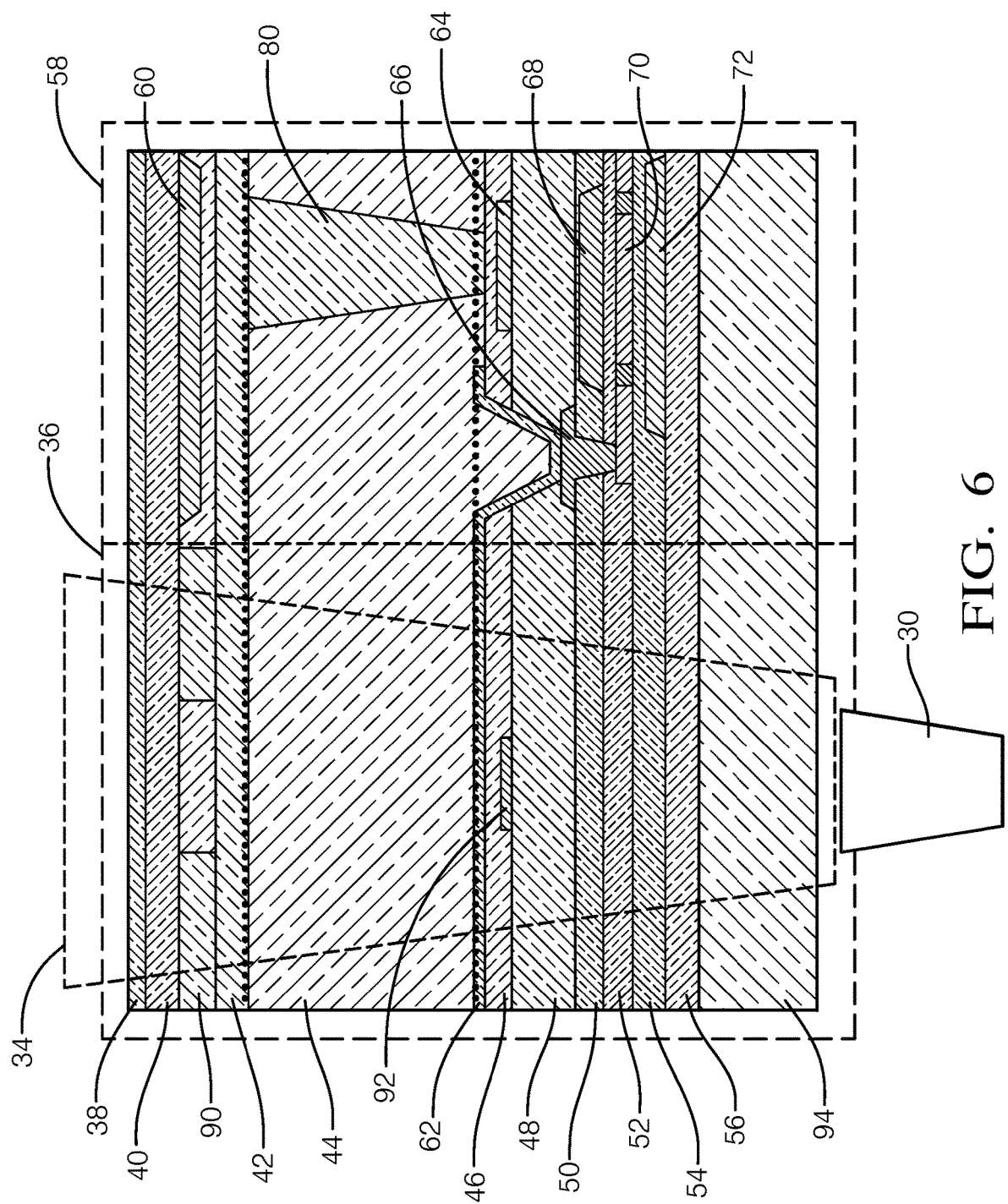
FIG. 6 shows an alternative embodiment of a display and a camera.

In some embodiments, the first portion 36 includes an additional pixel layer 90 in the location of the layer 42 as shown in FIG. 6. Such a pixel layer 90 does not include a black mask layer like the layer 60 but can include color filters for red, green and blue. With such a pixel layer 90 near the first side 24 of the first portion 36 and corresponding pixel electrodes 92 in the first portion 36, it is possible to include a low resolution image over the first portion 36 to further camouflage the presence of the camera 30. Other than the pixel electrodes 92, there is no metallization, such as that which establishes the layers 66-72, in the first portion 36.

The embodiment shown in FIG. 6 also includes a backlight module 94. The camera 30 is situated to obtain images through the backlight module 94. In this embodiment, the backlight is modified in the area of the camera field of view. The backlight module 94 includes reflecting nano-structures. Most of the reflecting nano-structures have a first dimension or height, which may be on the order of approximately 30 micrometers. The portion of the backlight module that is within the camera field of view includes nanostructures that have a second dimension or height that is considerably smaller than the first dimension. In one example embodiment, the nano-structures are fabricated to be less than two-tenths of the wavelength of the radiation detected by the camera 30. An example of such height is approximately 100 nanometers. Since larger nano-structures are less expensive to manufacture, the smaller-sized nano-structures are only included in the region or portion of the backlight module 94 in the area of the camera aperture. That portion may be less than 2 mm in diameter in some embodiments.

In each of the example embodiments, establishing different numbers of layers in the first portion 36 and the second portion 58 may be accomplished by masking off the first portion 36 during a process of establishing the layers of the display 22. Alternatively, at least some of the layers may be deposited in the area of the first portion 36 and then etched or otherwise removed during the display manufacturing process. In either case, the process of making the display includes establishing the first plurality of layers in the first portion 36 and establishing the second plurality of layers in the second portion 58 so that the second plurality of layers includes at least one additional layer more than the first plurality of layers. The camera 30 is situated near the second side 32 with the field of view 34 at least partially aligned with or coincident with the first portion 36.

Regardless of how many layers are in the first plurality in the first portion 36 and second plurality in the second portion 58, respectively, the total thickness of all of the layers in each portion is the same. Such a configuration of the display avoids localized stresses or variations in display stability across the display 22.

Another feature of the illustrated example embodiments is that polarizer layers may be included near the opposite sides 24, 32 of the display 22 and neither of the polarizer layers is placed under stress, which would be the case with previously proposed camera accommodations.

The different features of the illustrated embodiments may be combined in other ways not specifically illustrated and other embodiments are therefore possible. In other words, any feature of an illustrated embodiment may be included with one or more features of another embodiment to realize additional embodiments.

The preceding description is illustrative rather than limiting in nature. Variations and modifications to the disclosed example embodiments may become apparent to those skilled in the art without departing from the essence of this invention. The scope of legal protection provided to this invention can only be determined by studying the following claims.

We claim:

1. An assembly, comprising:
a display having a first side for displaying at least one image and a second side facing opposite the first side, the display comprising:
a first portion having a first plurality of layers between the first side and the second side; and
a second portion having a second plurality of layers between the first side and the second side, the second plurality of layers including at least one additional layer more than the first plurality of layers;
a camera situated near the second side of the display, a field of view of the camera being at least partially aligned with the first portion of the display; and
a backlight module comprising reflecting nano-structures, wherein a portion of the backlight module is aligned with the field of view of the camera, and wherein the reflecting nano-structures in the portion of the backlight module have a dimension that is smaller than others of the reflecting nano-structures in another portion of the backlight module.

2. The assembly of claim 1, wherein the at least one additional layer comprises an electrically conductive material.

3. The assembly of claim 2, wherein the at least one additional layer comprises metal.

4. The assembly of claim 2, wherein
the display comprises a liquid crystal display; and
the at least one additional layer comprises a gate line layer and a data line layer.

5. The assembly of claim 4, wherein the at least one additional layer comprises an insulator.

6. The assembly of claim 1, wherein
one of the layers in the first portion comprises an epoxy that is transparent to infrared radiation;
the one of the layers is aligned with a corresponding layer in the second portion; and
the corresponding layer in the second portion comprises liquid crystal.

7. The assembly of claim 1, wherein
one of the first plurality of layers near the first side comprises color filters; and
a corresponding one of the second plurality of layers near the first side comprises the color filters and at least one additional color filter.

8. The assembly of claim 1, wherein the first plurality of layers comprises at least one liquid crystal layer and a substrate layer on each of two opposite sides of the liquid crystal layer.

9. The assembly of claim 1, wherein
the first plurality of layers has a first total thickness between the first side and the second side;
the second plurality of layers has a second total thickness between the first side and the second side; and
the first total thickness is equal to the second total thickness.

10. The assembly of claim 1, wherein
the display is at least part of an instrument panel in a vehicle; and
the camera is situated to capture image information regarding at least one characteristic of a driver of the vehicle.

11. The assembly of claim 1, wherein
the camera is an infrared camera;
the first plurality of layers at least partially permit infrared radiation to pass through the first plurality of layers; and
the at least one additional layer hinders infrared radiation from passing through the at least one additional layer.

12. The assembly of claim 1:
wherein the display comprises a liquid crystal display;
wherein the camera comprises an infrared camera;
wherein the layers of the first plurality of layers are configured to at least partially permit infrared radiation to pass through the first plurality of layers; and
wherein the at least one additional layer of the second plurality of layers is configured to hinder infrared radiation from passing through the at least one additional layer.

13. An assembly, comprising:
display means for displaying at least one image on a first side of the display means, a second side of the display means facing opposite the first side, the display means comprising:

a first portion having a first plurality of layers between the first side and the second side, and
a second portion having a second plurality of layers between the first side and the second side, the second plurality of layers including at least one additional layer more than the first plurality of layers;
camera means for capturing image information, the camera means being situated near the second side of the display means, a field of view of the camera means being at least partially aligned with the first portion of the display means; and
a backlight module comprising reflecting nano-structures,
wherein a portion of the backlight module is aligned with the field of view of the camera means, and
wherein the reflecting nano-structures in the portion of the backlight module have a dimension that is smaller than others of the reflecting nano-structures in another portion of the backlight module.

14. The assembly of claim 13, wherein
at least one of the second plurality of layers comprises liquid crystal; and
the at least one additional layer comprises an electrically conductive material establishing at least one of a gate line layer and a data line layer.

15. The assembly of claim 13, wherein
one of the layers in the first portion comprises an epoxy that allows infrared radiation to at least partially pass through the epoxy;
the one of the layers is aligned with a corresponding layer in the second portion; and
the corresponding layer in the second portion comprises liquid crystal.

16. The assembly of claim 13, wherein
one of the first plurality of layers near the first side comprises color filters; and
a corresponding one of the second plurality of layers near the first side comprises the color filters and at least one additional color filter.

17. The assembly of claim 13, wherein
the display means is at least part of an instrument panel in a vehicle; and
the image information captured by the camera means corresponds to at least one characteristic of a driver of the vehicle.

18. The assembly of claim 13, wherein
the camera means comprises an infrared camera;
the first plurality of layers at least partially permit infrared radiation to pass through the first plurality of layers; and
the at least one additional layer hinders infrared radiation from passing through the at least one additional layer.

19. A method of making an assembly including a camera and a display, the method comprising:
establishing a first display panel structure comprising a first plurality of layers in a first portion of the display, the first plurality of layers being between a first side of the display that is configured to display at least one image and an oppositely facing second side of the display, the first plurality of layers including a layer configured to be transparent to infrared radiation;
establishing a second display panel structure comprising a second plurality of layers in a second portion of the display between the first side of the display and the second side of the display, the second plurality of layers including at least one additional layer more than the first plurality of layers, the second plurality of layers including a layer configured to be opaque to infrared radiation; and situating the camera near the second side of the display with a field of view of the camera at least partially aligned with the first portion of the display.

20. The method of claim 19, wherein at least one of the second plurality of layers comprises liquid crystal; and the at least one additional layer comprises an electrically conductive material establishing at least one of a gate line layer and a data line layer.

\* \* \* \* \*